United States Patent Office 3,493,044
Patented Feb. 3, 1970

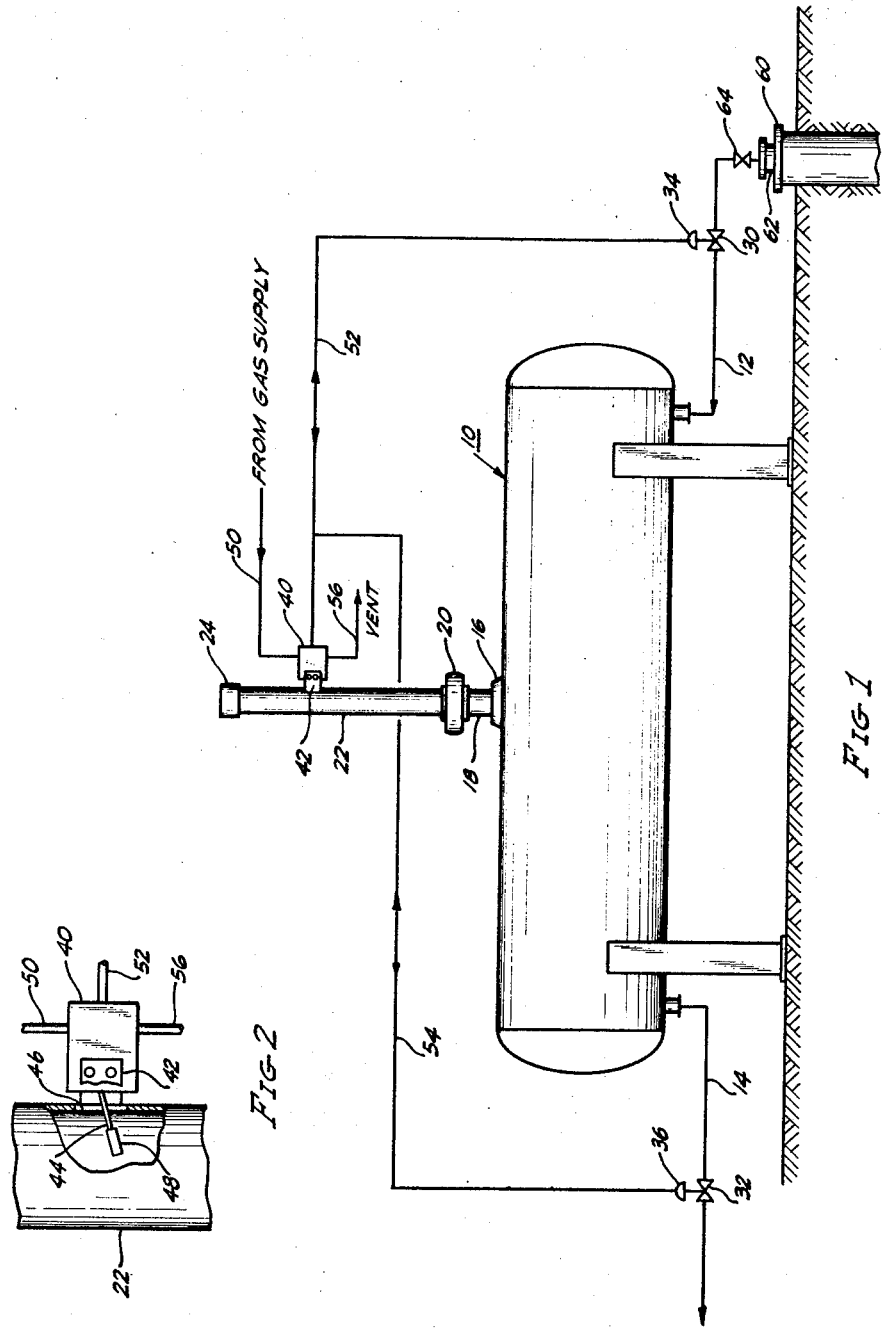

3,493,044
PRESSURE RELIEF SYSTEM
Eugene A. Selph, Houma, La., assignor to Union Oil Company of California, Los Angeles, Calif., a corporation of California
Filed Mar. 15, 1968, Ser. No. 713,368
Int. Cl. E21b *33/03;* F16k *17/16*
U.S. Cl. 166—75                 12 Claims

ABSTRACT OF THE DISCLOSURE

A pressure relief system for a pressure vessel including a safety head containing a thin membrane that ruptures at a predetermined pressure, means for detecting the flow of fluids through the safety head, and means for stopping the flow of fluids into the vessel. This pressure relief system is particularly useful in providing over-pressure protection for pressure vessels receiving fluids from producing oil and gas wells.

---

This invention concerns pressure relief systems, and more particularly concerns apparatus for the relief of excessive pressure in a pressure vessel and for automatically stopping fluid flow into the vessel on actuation of the pressure relief system. The apparatus of this invention is particularly adapted for the relief of excessive pressure in surface oil and gas production equipment and for automatically shutting in producing oil and gas wells.

Pressure vessels and piping systems require means for preventing over pressure which could rupture the vessel and/or piping. One means of preventing over pressuring is to install a safety head or rupture disk on the vessel. These devices contain a thin membrane that is designed to rupture or fail when pressure in the vessel reaches a predetermined value, allowing the fluid contents of the vessel to flow to the atmosphere or other lower pressure system. Since it is not desirable to install a valve at the rupture disk such valve may be inadvertently closed thereby rendering the relief system inoperable, when the disk is ruptured it is necessary to isolate the vessel from the supply source and downstream fluid systems to prevent continued flow of fluid to the atmosphere and to permit replacement of the rupture disk. This is a particular problem in the case of unattended oil and gas production equipment since the well may be produced to the atmosphere for substantial periods before it can be manually shut in.

Accordingly, it is a principal object of this invention to provide a relief system for a pressure vessel that on being actuated, automatically shuts off flow to the pressure vessel. Another object of the invention is to provide a device for automatically shutting off flow to a pressure vessel equipped with a rupturable safety head on the rupture of the safety head. Still another object of the invention is to provide means for automatically shutting in a producing well on the actuation of the surface production equipment's pressure relief system. Other objects and advantages of the invention will be apparent to those skilled in the art from the following detailed description and the appended drawings, in which:

FIGURE 1 schematically represents the application of this invention to the pressure relief system of a surface pressure vessel receiving fluid from a producing well; and FIGURE 2 illustrates apparatus for detecting the flow of fluid through the pressure relief system.

Referring now to FIGURE 1, a pressure vessel generally illustrated at 10 is provided with a fluid inlet pipe 12 and an outlet pipe 14. Vessel 10 is also provided with a nozzle 16 and relief pipe 18 fitted with safety head 20, which in turn is fitted with tail pipe 22 discharging to the atmosphere. The open end of tail pipe 22 is fitted with a loosely fitting cover 24, such as a plastic cap, to prevent rain and snow from entering the tail pipe. The safety head, also commonly referred to as a rupture disk, comprises an annular member, adapted for connection to the relief piping by a threaded connection, as illustrated, or by a conventional flanged joint. The annular member contains a thin membrane fluid-tightly held in a transverse position within the member so as to provide a barrier or seal preventing the flow of fluid therethrough. The membrane is designed to rupture at a pre-selected differential pressure. Thus, the membrane is ruptured when the difference in pressure exerted on the upstream and downstream sides of the membrane exceeds its rated bursting pressure. In the illustrated embodiment, atmospheric pressure is exerted on the low pressure side of the membrane and the membrane is designed to rupture when the pressure within vessel 10 exceeds atmospheric pressure by a pre-selected value.

An automatically operated valve 30 is installed in fluid inlet conduit 12 and a similar valve 32 is installed in fluid outlet conduit 14. Obviously, valve 34 can be omitted where fluids cannot flow from downstream sources back into vessel 10 through conduit 14, or where such flow can be prevented by a check valve installed in conduit 14. Also, a plurality of fluid inlet and outlet pipes can be employed to introduce fluids into and withdraw fluids from the vessel 10. Valves 30 and 32 are preferably a positive closing type of valve, such as a single seated globe valve, a plug valve, a ball valve, and angle valve, or the like, so as to provide positive closure against rather high differential pressures. The valves can be operated by any appropriate means, such as a pneumatic operator, piston operator, or by an electric motor. In the illustrated embodiment, the valves 30 and 32 are provided with pneumatic operators 34 and 36, respectively.

As more particularly illustrated in FIGURE 2, an actuator 40, such as a pneumatic pilot assembly, is mounted on tail pipe 22 by means of brackets 42. Pilot assembly 40 is provided with actuating arm 44 extending into tail pipe 22 through a small slot 46 cut in the wall thereof. Arm 44 is normally maintained in a downward position by the force of gravity or by a biasing means, but is moved upwardly about a pivot in the pilot 40 by fluids flowing upwardly through tail pipe 22. Arm 44 can be provided with a small extension 48, or paddle, to provide increased surface for the fluids to impinge against.

Air or other gas is supplied at a constant pressure to pilot 40 through conduit 50, and is transmitted to pneumatic operators 34 and 36 by conduits 52 and 54, respectively, An upward movement of arm 44 causes the control gas to be bled through vent 56, thereby causing valves 30 and 32 to close. These valves are preferably of the pneumatic pressure-to-close type, i.e., the valves close at low control pressure, thus providing for closing of the valves on failure of the control system.

Actuating means 40 can be any device capable of initiating the closure of valves 30 and 32 on detection of fluid flow through the relief system. Thus, the actuating means can be a pneumatic pilot of the type illustrated, an electric device such as a microswitch, or the like. Further, a time delay can be provided in the closing of the valve 32, so that valve 30 is closed first, and then valve 32. Also, it is often preferred that actuator 40 contain a manual reset so that the valves 30 and 32 will not be automatically reopened on the discontinuance of flow through the relief system.

Fluid inlet line 12 communicates a fluid source, such as the producing well 60 having production tubing 62 and manually operated well head valve 64, which can be the conventional Christmas tree assembly typically employed on oil and gas wells. Further, the well 60 can contain a pump to lift fluids from the producing zones to the surface.

If desired, pilot assembly 40 can also be adapted to shut down the pump on detection of fluid flow through the relief system.

In the operation of the illustrated embodiment of this invention, fluids are produced through tubing 62 of well 60 and transported to pressure vessel 10 by means of inlet pipe 12. The producing well can be manually shut in by means of well head valve 64. Fluids are withdrawn from vessel 10 and transported to a downstream location through said outlet pipe 14. If the pressure in vessel 10 exceeds atmospheric pressure by a predetermined value, the membrane in safety head 20 is ruptured permitting fluids to flow from the vessel 10 through tail pipe 22. Cap 24 is dislocated from the tail pipe 22 by the fluid stream and the issuing fluids are discharged to the atmosphere. The flowing fluid stream also causes arm 44 to be displaced upwardly, which in turn activates the pilot assembly causing the control gas to be bled from the diaphragms of valve operators 34 and 36, thus closing the valves 30 and 32. As soon as the vessel 10 is depressured, flow through the relief system will terminate. The valves will not reopen until the actuator is manually reset.

Various embodiments and modifications of this invention have been described, and further modifications will be apparent to those skilled in the art. Such modifications are included within the scope of this invention as defined by the following claims.

Having now described my invention, I claim:

1. In combination:
   a pressure vessel;
   an inlet conduit connected to said vessel for introducing fluids thereinto;
   a relief conduit connected to said vessel;
   a safety head installed in said relief conduit, said safety head containing a thin membrane that ruptures at a predetermined differential pressure across the membrane, thereby allowing fluids to flow from the vessel through said relief conduit;
   flow detection means mounted on said relief conduit for detecting the flow of fluid therethrough; and
   means responsive to said flow detection means for discontinuing the flow of fluids into said vessel on the detection of fluid flow through said relief conduit.

2. The combination defined in claim 1 in which said relief conduit discharges to the atmosphere.

3. The combination defined in claim 1 in which said means for detecting the flow of fluid through said relief conduit comprises an actuator mounted on said relief conduit that has a pivotedly mounted arm extending into said relief conduit through a slot in the wall thereof, said actuator initiating the closing of said valve upon the arm being deflected by fluid flowing through the relief conduit.

4. The combination defined in claim 1 including an outlet conduit for withdrawing fluid from said vessel, said outlet conduit containing a valve that is closed automatically on the detection of fluid flowing through said relief conduit.

5. In combination:
   a well adapted for the production of fluids from subterranean fluid-producing formations;
   a pressure vessel;
   an inlet conduit for transporting fluids from said well to said pressure vessel;
   an automatically operated valve in said inlet conduit;
   a relief conduit connected to said vessel;
   a safety head installed in said relief conduit, said safety head containing a thin membrane that ruptures at a predetermined differential pressure across the membrane, thereby allowing fluids to flow from said vessel through said relief conduit;
   flow detection means attached to said relief conduit for detecting the flow of fluid through said relief conduit; and
   means responsive to said flow detection means for closing said automatically operated valve on the detection of fluid flow through said relief conduit.

6. The combination defined in claim 5 including an outlet conduit for withdrawing fluid from said vessel, said outlet conduit containing an automatically operated valve that is closed on the detection of fluid flowing through said relief conduit.

7. The combination defined in claim 6 in which the closing of said valve in said outlet conduit is delayed until the valve in said inlet conduit is closed.

8. The combination defined in claim 5 in which said means for detecting the flow of fluid through said relief conduit is an actuator mounted on said relief conduit, and which includes a pivotedly mounted arm extending into said conduit through a slot in the wall of said conduit, said arm being deflected by fluid flowing through said relief conduit to initiate the closing of said valve.

9. The combination defined in claim 8 in which said valve is pneumatically operated and said actuator is a pneumatic pilot.

10. In combination:
    a well adapted for the production of fluids from subterranean fluid-producing formations;
    a pressure vessel;
    an inlet conduit for transporting fluids from said well to said pressure vessel;
    an automatically operated valve in said inlet conduit for controlling the flow of fluids therethrough;
    a relief conduit connected to said vessel;
    a safety head installed in said relief conduit, said safety head containing a transverse thin membrane that ruptures when the differential pressure across the membrane exceeds a predetermined value, thereby allowing fluids to flow from said vessel through said relief conduit; and
    an actuator mounted on said relief conduit having a pivotedly mounted arm extending into said conduit through a slot in the wall of said conduit, said actuator initiating the closing of said valve upon the arm being deflected by fluid flowing through said relief conduit.

11. The combination defined in claim 10 including an outlet conduit for withdrawing fluid from said vessel, said outlet conduit containing an automatically operated valve that is closed on the detection of fluid flowing through said relief conduit.

12. The combination defined in claim 11 in which the closing of said valve in said outlet conduit is delayed until the valve in said inlet conduit is closed.

References Cited

UNITED STATES PATENTS

| | | | |
|---|---|---|---|
| 2,553,267 | 5/1951 | Nedoh | 137—68 |
| 2,776,022 | 1/1957 | Beller | 55—311 |
| 2,895,492 | 7/1959 | Bell | 137—68 |

JAMES A. LEPPINK, Primary Examiner

U.S. Cl. X.R.

137—68; 55—311